(12) United States Patent
Jalluri et al.

(10) Patent No.: US 11,604,456 B2
(45) Date of Patent: Mar. 14, 2023

(54) SYSTEM FOR MONITORING MACHINING PROCESSES OF A COMPUTER NUMERICAL CONTROL MACHINE

(71) Applicant: Ford Global Technologies, LLC, Dearborn, MI (US)

(72) Inventors: Chandra Sekhar Jalluri, Canton, MI (US); Himanshu Rajoria, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 249 days.

(21) Appl. No.: 16/815,693

(22) Filed: Mar. 11, 2020

(65) Prior Publication Data

US 2021/0286348 A1    Sep. 16, 2021

(51) Int. Cl.
*G05B 19/418* (2006.01)
(52) U.S. Cl.
CPC ............... *G05B 19/41875* (2013.01); *G05B 2219/32366* (2013.01)
(58) Field of Classification Search
CPC .............. G05B 19/41875; G05B 2219/32366
See application file for complete search history.

(56) References Cited

U.S. PATENT DOCUMENTS

| | | | |
|---|---|---|---|
| 8,112,381 B2 | 2/2012 | Yuan et al. | |
| 9,826,338 B2 | 11/2017 | Pal | |
| 2007/0067059 A1* | 3/2007 | Travez | B23Q 17/0971 |
| | | | 700/160 |
| 2007/0088454 A1* | 4/2007 | Jalluri | G05B 19/4065 |
| | | | 700/159 |
| 2018/0275630 A1* | 9/2018 | Kao | G05B 19/4065 |
| 2018/0313755 A1* | 11/2018 | Hatch | G01N 33/2888 |
| 2018/0341248 A1* | 11/2018 | Mehr | G06N 3/08 |
| 2019/0101892 A1* | 4/2019 | Satou | G05B 19/4065 |

(Continued)

FOREIGN PATENT DOCUMENTS

EP    1650623 A1 *  4/2006  ......... G05B 19/4065

OTHER PUBLICATIONS

Shiklo, B., How IIoT Transforms Condition Monitoring, available at URL https://www.scnsoft.com/blog/iot-for-condition-monitoring.

(Continued)

*Primary Examiner* — Vincent H Tran
(74) *Attorney, Agent, or Firm* — Burris Law, PLLC

(57) ABSTRACT

A system includes a computer numerical control (CNC) machining system configured to perform a machining operation to define a feature on a workpiece and a machine edge controller disposed external of the machining system and in communication with the CNC machine system. The machine edge controller is configured to perform a machining evaluation during the machining operation. In executing the machining evaluation, the machine edge controller is configured to acquire data indicative of characteristics of the CNC machining system during the machining operation and compare the data with one or more machining baseline parameters associated with the machining operation to determine an abnormal operation of the CNC machining system. The one or more machining baseline parameters define a nominal response of the CNC machining system for performing the machining operation.

18 Claims, 5 Drawing Sheets

(56) References Cited

U.S. PATENT DOCUMENTS

2019/0154032 A1    5/2019  Pal et al.
2019/0346822 A1*  11/2019  Jalluri ............... G05B 19/4065
2020/0082297 A1*   3/2020  Watanabe ............. G06N 5/04
2020/0249650 A1*   8/2020  Satou ................ G06N 5/04

OTHER PUBLICATIONS

Shiklo, B., How IoT Condition Monitoring Maintains Machine Health, available at URL https://www.roboticsbusinessreview.com/manufacturing/how-iot-condition-monitoring-maintains-machine-health/.

* cited by examiner

SYSTEM FOR MONITORING MACHINING PROCESSES OF A COMPUTER NUMERICAL CONTROL MACHINE

FIELD

The present disclosure relates to system and method for monitoring a machining process of a computer numerical control (CNC) machine.

BACKGROUND

The statements in this section merely provide background information related to the present disclosure and may not constitute prior art.

In large-scale production environments such as in automotive manufacturing, there has been an increase on automation. For example, dozens of computer numerical control (CNC) machines may be provided in a single manufacturing facility to execute preprogrammed sequence of commands to automate various machining operations. In addition to machining, CNC machines may perform various preventive maintenance routines such as scheduled tool changes, cleanings, and warm-ups.

Typically, a single CNC machine is monitored by a dedicated monitoring controller that performs simple diagnostics based on data from sensors disposed on the CNC machine and/or numerical controls provided to the CNC machine. Complex data analysis for a single or multiple CNC machines is inhibited by the current monitoring controllers. These and other issues are addressed by the teachings of the present disclosure.

SUMMARY

This section provides a general summary of the disclosure and is not a comprehensive disclosure of its full scope or all of its features.

In one form, the present disclosure is directed toward a system that includes a computer numerical control (CNC) machining system configured to perform a machining operation to define a feature on a workpiece and a machine edge controller disposed external of the CNC machining system and communicably coupled to the CNC machining system. The machine edge controller is configured to perform a machining evaluation during the machining operation. In executing the machining evaluation, the machine edge controller is configured to acquire data indicative of characteristics of the CNC machining system during the machining operation, and compare the data with one or more machining baseline parameters associated with the machining operation to determine an abnormal operation of the CNC machining system. The one or more machining baseline parameters define a nominal response of the CNC machining system for performing the machining operation.

In another form, the CNC machining system includes a CNC machine operable to machine the feature on the workpiece, a machine controller configured to operate the CNC machine and a sensor. The machine controller is configured to provide control signals to the CNC machine during the machining operation. The sensor is configured to measure an operational characteristic of the CNC machine. The data acquired by the machine edge controller includes the operational characteristic of the CNC machine from the sensor, the control signals from the machine controller, or a combination thereof.

In yet another form, the machine controller of the CNC machining system is communicably coupled to the machine edge controller by way of a wireless communication link or wired communication link.

In one form, the sensor of the CNC machining system is communicably coupled to the machine edge controller by way of a wireless communication link or wired communication link.

In another form, the machine edge controller is configured to perform a corrective action in response to the CNC machining system operating abnormally. In one variation, corrective action includes having the CNC machining system stop the machining operation, issue a notification to an operator regarding the abnormal activity, perform a non-machining operation, or a combination thereof.

In one form, the present disclosure is directed toward a system including a machining system configured to perform a machining operation to define a feature on a workpiece and a machine edge controller disposed external of the machining system. The machining system includes a CNC machine operable to machine the feature on the workpiece, a machine controller configured to operate the CNC machine, and a sensor. The machine controller is configured to provide control signals to the CNC machine during the machining operation and the sensor is configured to measure an operational characteristic of the CNC machine. The machine is communicably coupled to the machine controller and the sensor. The machine edge controller is configured to perform a machining evaluation during the machining operation. In executing the machining evaluation, the machine edge controller is configured to acquire data indicative of the operational characteristic of the CNC machine from the sensor, the control signals from the machine controller, or a combination thereof, and compare the data with one or more machining baseline parameters associated with the machining operation to determine an abnormal operation of the CNC machine. The one or more machining baseline parameters define a nominal response of the CNC machine for performing the machining operation.

In another form, the machine edge controller is configured to perform a learn process to define the one or more machining baseline parameters based on the numerical control of the CNC machine, the operational characteristic detected by the sensor, or a combination thereof.

In yet another form, the machine controller is configured to store a plurality of machining programs to have the CNC machine perform a plurality of machining operations for defining one or more features on the workpiece. The machine edge controller, during the learn process, is configured to define at least one machining baseline parameter for each of the plurality of machining operations. The defined at least one machining baseline parameter is provided as the one or more machining baseline parameters.

In one form, the machine controller is configured to provide contextual information regarding the machining operation to the machine edge controller. In one variation, the contextual information includes a part number of the workpiece, a timestamp, a program identification for the machining operation being performed, information identifying type of tool being used, or a combination thereof.

In another form, the machine edge controller is configured to perform a corrective action in response to the CNC machine operating abnormally. The corrective action includes having the machining system stop the machining operation, issue a notification to an operator regarding the abnormal activity, perform a non-machining operation, or a combination thereof.

In yet another form, the machining system is configured to perform a non-machining operation as part of a routine maintenance of the CNC machine, and the machine edge controller is configured to perform a non-machining evaluation during the non-machining operation. In executing the non-machining evaluation, the machine edge controller is configured to acquire data during the non-machining operation from the sensor, the machine controller, or a combination thereof, and compare the data acquired for the non-machining operation with a non-machining baseline parameter associated with the non-machining operation to determine the abnormal operation of the CNC machine.

In another form, the system further includes a manufacturing analysis system disposed remotely from the machine edge controller and the machining system. The manufacturing analysis system includes a server and is communicably coupled to the machine edge controller to receive and store the data indicative of the operational characteristic from the sensor, the control signals from the machine controller, or a combination thereof.

In yet another form, the system further includes a plurality of the machining systems communicably coupled to the machine edge controller. The machine edge controller performs the machining evaluation for each of the plurality of machining system based on the data received from a respective machining system and the one or more machining baseline parameters for the respective machining system.

In one form, the present disclosure is directed toward a system that includes a machining system and a machine edge controller disposed external of the machining system. The machining system is configured to perform a plurality of machining operations to define one or more features on a workpiece using one or more tools. The machining system includes a computer numerical control (CNC) machine operable to machine the one or more features on the workpiece, a machine controller configured to operate the CNC machine, and a plurality of sensors configured to measure one or more operational characteristics of the CNC machine. The machine controller is configured to provide control signals to the CNC machine during a selected machining operation from among the plurality of machining operations. The machine edge controller is communicably coupled to the machine controller and the plurality of sensors. The machine edge controller is configured to perform a machining evaluation during the selected machining operation. In executing the machining evaluation, the machine edge controller is configured to acquire data indicative of the operational characteristic of the CNC machine from the plurality of sensors, the control signals from the machine controller, or a combination thereof, and compare the data with one or more machining baseline parameters associated with the selected machining operation to determine an abnormal operation of the CNC machine. The one or more machining baseline parameters define a nominal response of the CNC machine for performing the machining operation.

In another form, the machining system is configured to perform a plurality of non-machining operations as part of a routine maintenance of the CNC machine. The machine edge controller is configured to perform a non-machining evaluation during a selected non-machining operation from among the plurality of non-machining operation. In executing the non-machining evaluation, the machine edge controller is configured to acquire data during the selected non-machining operation from the plurality of sensors, the machine controller, or a combination thereof, and compare the data acquired for the non-machining operation with a non-machining baseline parameter associated with the non-machining operation to determine the abnormal operation of the CNC machine. The non-machining baseline parameter defines a nominal response of the machining system for performing the selected non-machining operation.

In yet another form, the machining system having the machine controller and the plurality of sensors is communicably coupled to the machine edge controller by way of a wireless communication link, wired communication link, or a combination thereof.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
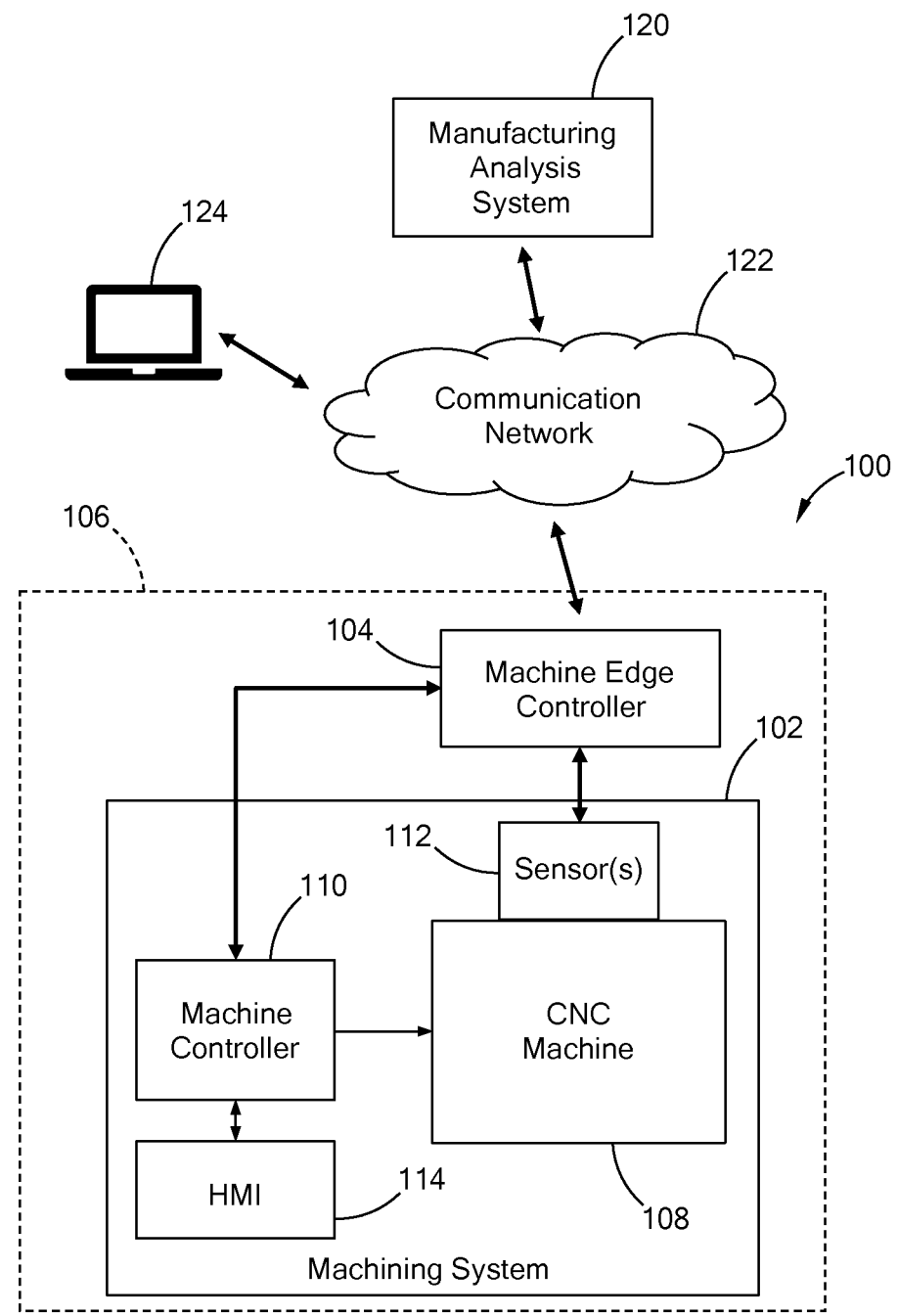
FIG. 1 illustrates a manufacturing monitoring system having a machine edge controller and a machining system in accordance with the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A manufacturing facility generally includes multiple machining systems such as computer numerical control (CNC) systems for performing drilling, boring, reaming, milling, and/or other machining operations on workpieces. The present disclosure is directed toward a manufacturing monitoring system that includes a machine edge controller configured to detect abnormal operations of one or more machining systems based on data acquired from the machining system during the machining operation. In one form the machine edge controller is provided an edge computing device provided within the manufacturing facility to perform real-time monitoring of the machining system.

Referring to FIG. 1, a manufacturing monitoring system 100 includes a machining system 102 and a machine edge controller 104 that is communicably coupled to the machining system 102 via wired and/or wireless communication link. In one form, the machining system 102 and the machine edge controller 104 are provided in a manufacturing facility generally represented with reference number 106. While one machining system 102 is illustrated, it should be readily understood that the manufacturing facility 106 may include a plurality of machining systems 102 and one or more machine edge controllers 104. In addition, a given machine edge controller 104 may monitor the performance of one or more machining systems 102.

In one form, the machining system 102 includes a CNC machine 108, a machine controller 110 configured to control the CNC machine 108, one or more sensors 112 disposed about the CNC machine 108, and one or more human machine interfaces (HMI) 114. The machine controller 110 operates the CNC machine 108 to perform a plurality of operations including machining operations for forming feature(s) on a workpiece and non-machining operation(s) for performing preventive maintenance routines, such as scheduled tool changes, cleanings, and warm-up routines.

Figure 2:
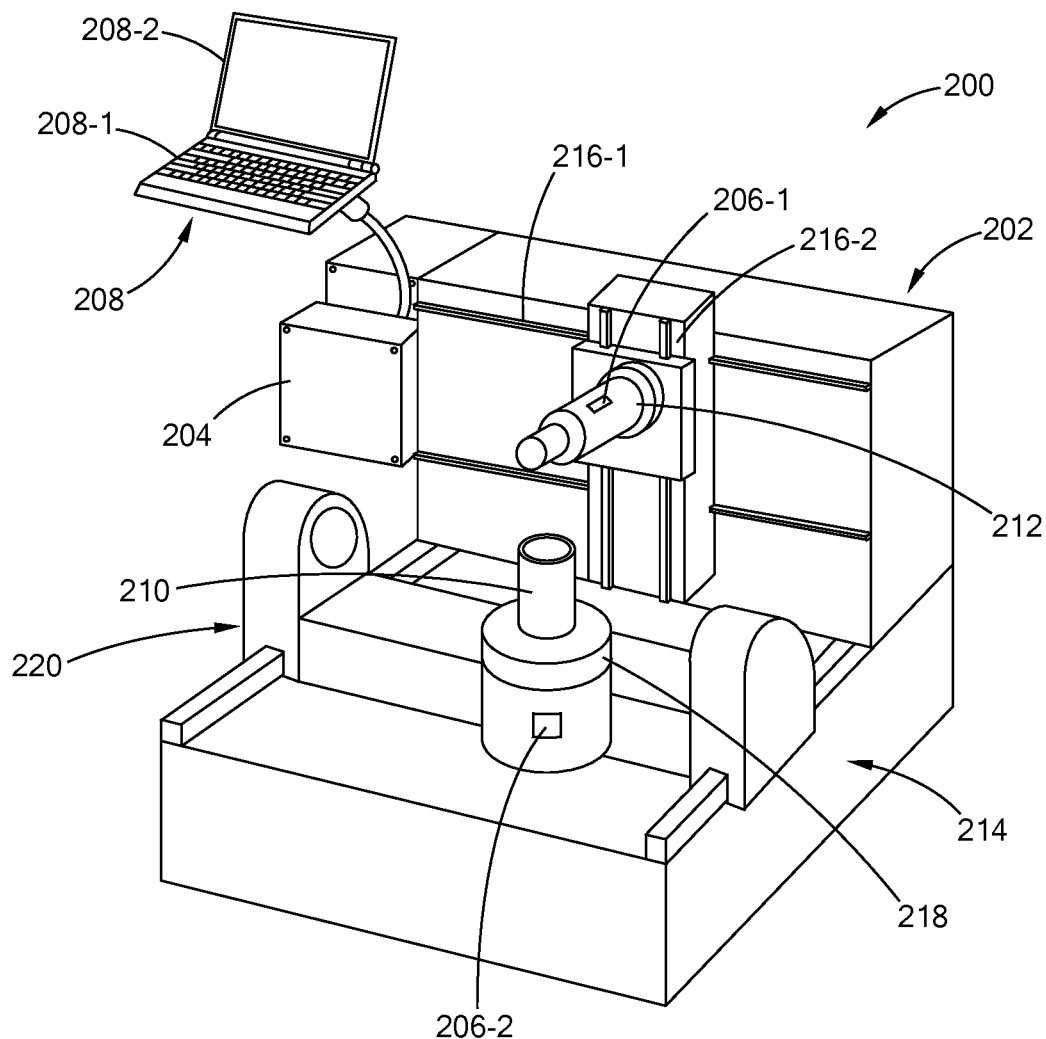
FIG. 2 illustrates an exemplary computer numerical control (CNC) machining system.

Referring to FIG. 2, an example machining system 200 is provided and may be provided as the machining system 102 of the present disclosure. The machining system 200 includes a CNC machine 202, a machine controller 204, sensors 206-1 and 206-2 (collectively "sensors 206"), and an HMI provided as a laptop 208 including a keyboard 208-1 and a monitor 208-2. It should be readily understood that the present disclosure is applicable to other machines and should not be limited to the machine system 200 depicted.

In one form, the CNC machine 202 is operable to form parts, such as gear sets, torque converters, etc., from a workpiece 210. The CNC machine 202 is a multi-axis machine that includes a spindle arm (i.e., spindle) 212 and a table 214 for supporting the workpiece 210. The spindle 212 and the table 214 are moveable relative to each other along multiple axes to align the spindle 212 with a portion of the workpiece 210 to be machined. For example, in one form, the spindle 212 is configured to hold and rotate a tool attached to an end of the spindle 212, and is operable to move along multiple axes by way of sliders 216-1 and 216-2. The table 214 is configured to include a rotatable plate 218 and a slider 220 for adjusting the position of the workpiece 210. While specific component are provided illustrated, the CNC machine 202 may include other components such as a tool magazine for housing the various tools used by the CNC machine 202 and motors for moving dynamic components like the spindle 212, the sliders 216-1, 216-2, 220, and/or the rotatable plate 218, among others.

The machine controller 204 outputs electrical signals to the CNC machine 202 to move one or more dynamic components. For example, based on the machining operation to be performed, the machine controller 204 controls the torque, position, orientation, and other operation parameters of the spindle 212 to have the spindle 212 define a feature on the workpiece 210. The machine controller 204 also has contextual information relating to the operation being performed such as the part number of the workpiece operation, the type of operation to be performed, and/or the tool being used, among others.

Figure 3:
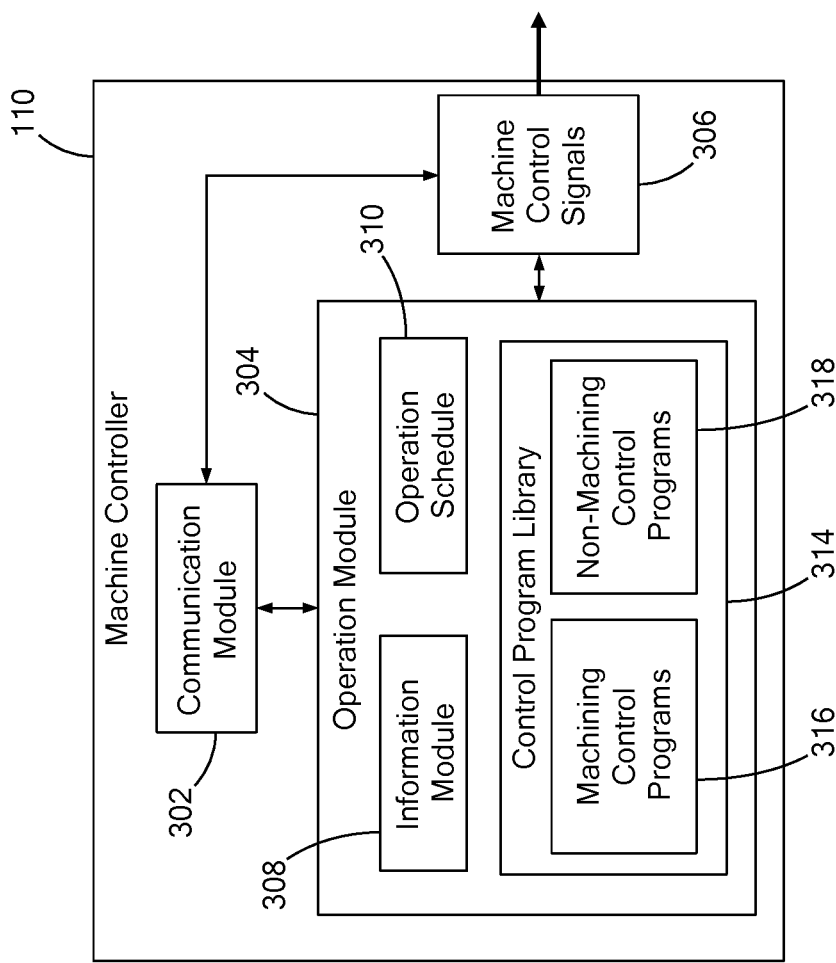
FIG. 3 is a block diagram of a machine controller of the machining system of FIG. 1.

More particularly, referring to FIG. 3, in one form, the machine controller 110, includes a communication module 302, an operation module 304, and a machine control signals 306. In one form, the machine controller 110 includes one or more microprocessors and memory for storing computer programs specific to the CNC machine and configured to perform the operations of modules 302, 304, and 306. In another form, the machine controller 110 is a programmable logic controller (PLC) with a numerical control controller that are configured to perform the operations of modules 302, 304, and 306. In one variation, the machine controller 110 may communicate with the CNC machine 108 using various suitable protocols such as MQ telemetry transport (MQTT) and open platform communications unified architecture (OPC-UA), among others.

The communication module 302 is configured to communicably couple the machine controller 110 to the machine edge controller 104 and the HMI 114. Accordingly, the communication module 302 may include input-output ports for wired communication links, transceivers, routers, among other components for establishing wireless communication through for example cellular network, Wi-Fi type networks, among other networks.

The operation module 304 is configured to select the operation to be performed by the CNC machine 108 based on, for example, a machine schedule and/or information associated with a workpiece to be machined. In one form, the operation module 304 includes an information module 308, an operation schedule 310, and a control program library 314. The control program library 314 includes machining control programs 316 and non-machining control programs 318. The machining control programs 316 are configured to select a tool from the tool magazine and have the CNC machine 108 perform one or more machining operations such as drilling, milling, and/or boring, for defining one or more features on the workpiece.

The non-machining control programs 318 are configured to have the CNC machine 108 perform a non-machining operation such as cleaning, maintenance check, warm-up, and/or a machine health routine, among other. For example, in a machine health routine, a component analysis program, such as a spindle analysis or a slide analysis, is performed by the machining system, and data indicative of a vibration, temperature, or other suitable response of the CNC machine is collected and analyzed. In one form, for the spindle analysis, the spindle is driven at one or more predefined rotational speeds for one or more predefined durations. The operation of the spindle provides a vibration profile that includes an acceleration portion, a steady speed portion, and/or a deceleration portion. Data from the sensors 112 is analyzed to determine, for example, a movement-specific data profile for the movement of the spindle. In one form, for the slide analysis, the machine controller 110 moves one or more of the sliders at one or more predefined speeds. In one form, the slide analysis provides information about a particular slider as that slider moves, and also provides information on the cross-transmissivity between sliders. That is, the slide analysis may characterize the effect a moving slider may have on another slider. While specific examples of machine health routines are provided, other machine health routines may be implemented and/or other spindle and slide analyses may be provided.

The information module 308 is configured to obtain contextual information related to the operation being performed such as but not limited to the part number of the workpiece, the name of the operation to be performed (e.g., a program identification for the machining/non-machining operation being performed), timestamp, type and/or identification of tool being used, and/or shift, among others. In one form, information regarding the workpiece may be acquired from an identification tag (e.g., barcode, QR-code, etc.) provided with the workpiece and scanned by a scanner (not shown). In another form. The machine controller 110 may also be communicably coupled to a facility network via the communication module 302 that provides details regarding the workpieces in real-time.

In one form, the operation schedule 310 provides a machining cyclic schedule and a non-machining cyclic schedule. The machining cyclic schedule defines a timetable for performing one or more machining operation and the non-machining cyclic schedule defines a timetable for performing one or more non-machining operation. The machining cyclic schedule and the non-machining cyclic schedule may be adjusted based on, for example, an input from a user or the machine edge controller 104.

Based on operation schedule and/or information related to the workpiece, the machine control signals 306 generates numerical controls to the CNC machine 108 to perform the machining/non-machining operation. In one form, the numerical controls are electrical signals for driving one or more of the motorized components of the CNC machine 108. During operation, the communication module 302 is configured to provide data indicative of the numerical controls to the machine edge controller 104, which in return analyzes the data to determine if the CNC machine 108 is operating abnormally The sensors 112 are configured to monitor operation characteristics of the CNC machine 108 which includes environmental conditions such as temperature. Accordingly, the sensors 112 may include, but is not limited to, temperature sensor(s), accelerometer(s), acoustic sensor(s), and/or torque sensor(s). As an example, in FIG. 2, the sensor 206-1 is an accelerometer that measures a vibrational response of the spindle 212. In another example, a temperature sensor (not shown) may be disposed near a tool provided at the end of the spindle 212 to measure the fluctuation of temperature due to heat caused by, for example, motors, cutting energy, idle operation and friction.

In one form, the sensors 112 may include sensors disposed with the CNC machine 108 and/or separate discrete sensors that are attachable to and detachable from the CNC machine 108. The sensors 112 are communicably coupled to the machine edge controller 104 via wireless and/or a wired communication link to output data of the measured characteristics (e.g., temperature, acceleration, vibration, torque, etc.).

Figure 4:
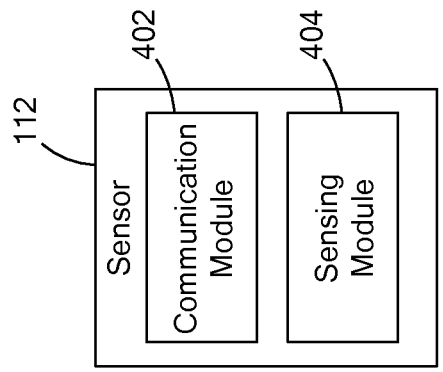
FIG. 4 is a block diagram of a sensor of the machining system of FIG. 1.

More particularly, referring to FIG. 4, the sensor 112, includes a communication module 402 for establishing wired and/or wireless communication with the machine edge controller 104 and a sensing module 404 that measures the operation characteristics. The communication module 402 may include input-output port, and/or transceivers for establishing wireless communication through for example cellular network, Wi-Fi type networks, among other components. If the sensor 112 is provided with the CNC machine 108, the sensor 112 may use the communication module 302 provided by the machine controller 110 to transmit data to the machine edge controller 104.

The sensing module 404 includes components for measuring the operation characteristics. For example, for an accelerometer, the sensing module 404 includes piezoelectric, micro-electromechanical systems (MEMS), piezoresistive and/or capacitive components for converting mechanical motion (vibration) to an electrical signal. In another example, for a temperature sensor, the sensing module 404 includes thermocouples, thermistors, resistance temperature detectors (RTDs) and/or infrared sensors for measuring temperature. In one form, in addition to or in lieu of transmitting raw signal data from the sensing module 404, the sensor 112 may include a microprocessor (not shown) configured to perform data analytics on the raw signal data to output maximum, minimum, median, and/or mean values for a predetermined time period. The processor may also convert raw electrical signal values to respective unit measurement, for example, temperature values (° C./° F.), acceleration, etc. While specific sensor examples are provided, other types of sensors may be used. In addition to contextual information from the machine controller 110, the data from the sensor 112 may be used to infer information of the operation state of the CNC machine 108. For example, vibration data may indicate that a spindle is rotating and thus, is performing a machining process.

The HMI 114 includes devices such as, monitors, touchscreens, buttons, keyboards, and mouse, among others, for exchanging data with a user such as a machine operator. In one form, the HMI 114 provides information regarding the performance of the machining system 102 such as identification information of the CNC machine 108, the machining operation being performed, part information of the workpiece being processed, date, time, shift information, and/or warning/error notifications.

Using the data from the machine controller 110 and/or the sensors 112, the machine edge controller 104 is configured to monitor an operation (machining and/or non-machining) being performed by the CNC machine 108 to determine if the CNC machine 108 is operating in line with baseline parameters. In one form, the machine edge controller 104 is an edge computing device provided within the facility 106 to perform real-time processing of data from the machining system 102. Accordingly, in one form, the machine edge controller 104 is a computing device having a microprocessor and memory storing computer programs executable by the microprocessor to perform the functions described herein.

Figure 5:
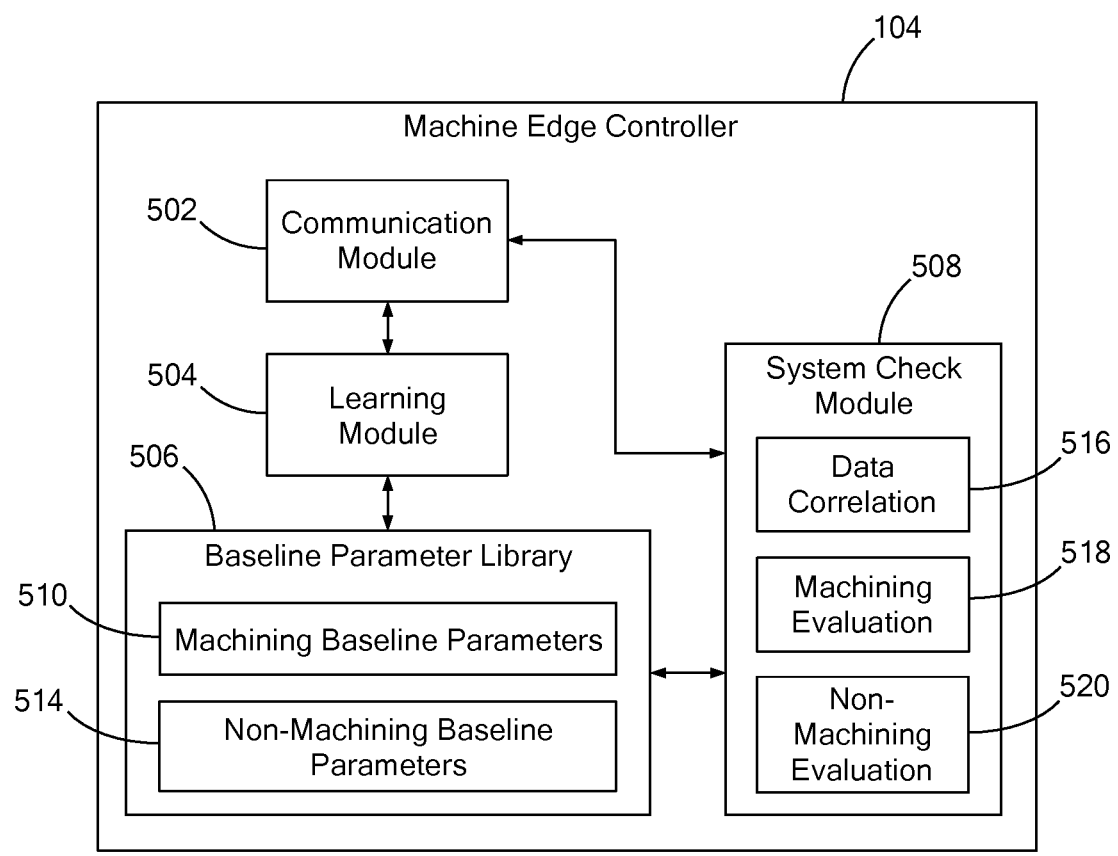
FIG. 5 is a block diagram of the machine edge controller of FIG. 1.

Referring to FIG. 5, in one form, the machine edge controller 104, includes a communication module 502, a learning module 504, a baseline parameter library 506, and a system check module 508. The communication module 502 is configured to communicably couple to external devices such as the machine controller 110, and the sensors 112, among others, by way of wired and/or wireless communication link(s). Accordingly, the communication module 502 includes input-output ports, transceivers, routers, among other components for establishing wired communication and/or wireless communication via, for example, a cellular network, Wi-Fi-type networks.

The learning module 504 is configured to define baseline parameters for the machining system 102 that are used to assess whether the machining system 102 is operating normally. The learning module may also be referred to as a learn process. The baseline parameters define a nominal response of the machining system 102 measured by data from the machine controller 110 and/or the sensors 112 for the operation being performed under as-designed conditions. For a selected operation, in one form, the learning module 504 acquires data from the machining system 102 for a selected number of cycles (e.g., 25, cycles, 50 cycles, 100 cycles, etc.) and generates one or more baseline parameters for the selected operation. As an example, for a given machining operation, the learning module 504 may generate a machining baseline parameter that provides a nominal response of the CNC machine 108 during the given machining operation. More particularly, each feature formed on a workpiece by the machining system 102 may generate a different response of the CNC machine 108 due to, for example, movement of the spindle, sliders, and/or rotatable plate, among other components. The response may include but is not limited to vibrational response, temperature, electrical signals for driving one or more of the motorized components. In addition, each tool used by the CNC machine 108 may generate a different response measured by the sensor 112 and/or machine controller 110. For example, various drills may have different vibrational responses when performing a machining operation. Accordingly, based on data from the sensors 112 and/or the machine controller 110, the learning module 504 defines a machining baseline parameter for the machining operations performed by the CNC machine 108 and for each machining operation may identify the feature and/or tool associated with machining operation. In addition to machining operations, the learning module 504 also defines non-machining baseline parameters for each of the non-machining operations such as scheduled tool changes, cleanings, warm-up routines, and/or machine health checks. A non-machining baseline parameter defines a nominal response of the machining system for performing a selected non-machining operation.

Using the contextual information from the machine controller 110 and/or inferring contextual information from the data from the sensors 112, the learning module 504 is able to identify the operation being performed, and associate the data being received from the machining system 102 with the identified operation to define the baseline parameter. For example, with the contextual information providing the name of the machining operation being performed and identifying the tool being used, the learning module 504 defines a baseline parameter for the identified machining operation using the identified tool based on the numerical control of the CNC machine, the operation characteristic(s) detected by the sensor(s) 112 (e.g., temperature, vibration, acoustic, etc.), or a combination thereof.

The learning module 504 is configured to store the baseline parameters in the baseline parameter library 506. Accordingly, in one form, the baseline parameter library 506 includes machining baseline parameters 510 and non-machining baseline parameters 514. In one form, the baseline parameters are stored as signal profiles, statistical thresholds such as maximum threshold, minimum threshold, and/or average threshold.

In one form, the learning module 504 is configured to dynamically update the baseline parameters stored in the baseline parameter library 506. For example, the learning module 504 may update the baseline parameters based on a defined time period (e.g., weekly, monthly, etc.) and data collected during the defined time period. Accordingly, the learning module 504 may include machine learning algorithm for defining and/or updating the baseline parameters.

After learning the baseline parameters, the system check module 508 is configured to analyze the operation of the machining system 102 and specifically, the CNC machine 108 to determine if the machining system 102 is performing abnormally. In one form, the system check module 508 is configured to perform a data correlation 516, a machining evaluation 518, and a non-machining evaluation 520 based on the data received from the machining system 102.

For the data correlation 516, the system check module 508 analyzes the data received which includes contextual information, numerical controls, and/or operation characteristics of the machining system 102 to determine whether a machining operation or a non-machining operation is being performed. For the machining operation, the data correlation 514 further identifies the tool being used by the CNC machine 108, the feature being formed, part information, environmental conditions (temperature), time, and/or date, among other information. In one form, the data correlation constructs a time-lapse graph that maps the operation of the CNC machine 108 with the data from the sensor(s) 112 and/or the machine controller 110, which may also be provided as a real time signal profile of the machining system 102.

For the machining evaluation 518, the system check module 508 is configured to compare the data being received from the machining system 102 with one or more baseline parameters associated with the identified machining operation to determine an abnormal operation of the CNC machine 108. Specifically, based on contextual information for a specific machining operation, the system check module 508 acquires the machining baseline parameter(s) associated with the machining operation, the identified feature being formed and/or the tool being used from the baseline parameter library 506. If the data from the machining system 102 substantially satisfies the machining baseline parameters (e.g., data within a set threshold and/or tolerance), the machining system 102 and specifically, the CNC machine 108 is provided as being normal. If not, the system check module 508 determines that the machining system 102 is operating abnormally and performs a corrective action.

More particularly, in one form, if the machining baseline parameters are provided as signal profiles, the machining evaluation 518 conducts a time and/or frequency band signal analysis to determine if the signal profiles are substantially similar to the time-lapse graph constructed using the data being received. If so, the system check module 508 determines that the machining system 102 is operating normally. In addition to or in lieu of the signal analysis, if the feature and/or tool baseline parameters are provided as statistical thresholds such as maximum threshold, minimum threshold, and/or average threshold, the machining evaluation 518 determines if the data exceeds one or more thresholds. If so, the system check machine determines that the machining system 102 is abnormal and performs a corrective action. In one form, the machining evaluation 518 is configured to include different analyses to detect different abnormal conditions. Such analyses include but are not limited to: root-mean-square, peak amplitude, profile analysis, fast Fourier transformation (FFT), cepstrum, and/or filter techniques (bandpass, lowpass).

Figure 6A:
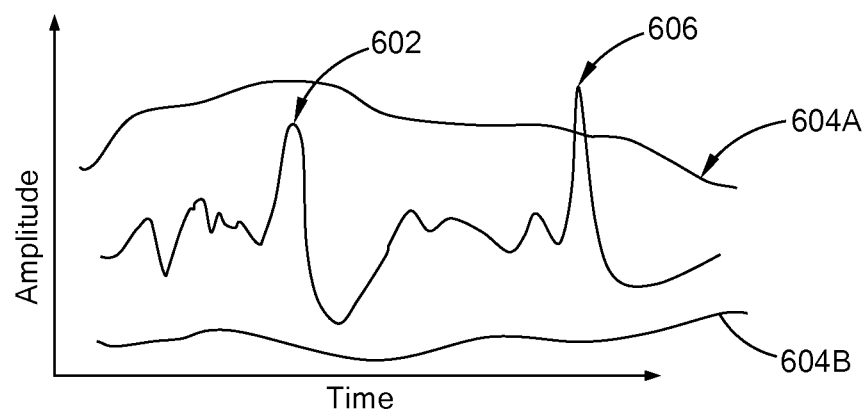
FIGS. 6A and 6B illustrate exemplary graphs of signal profiles of machine control signals during a machining operation in accordance with the present disclosure.
Figure 6B:
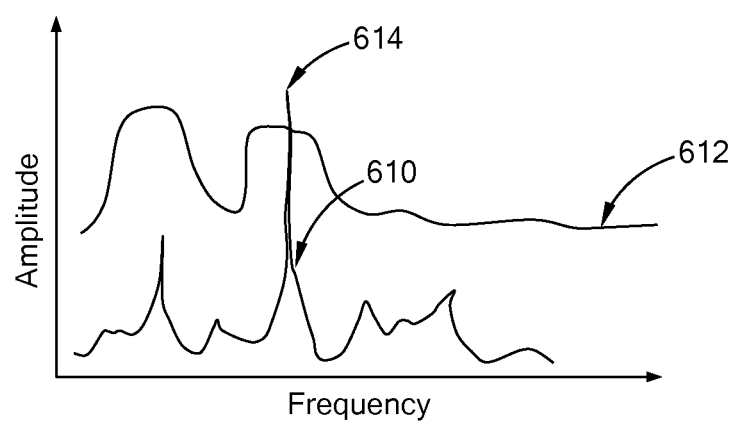

For example, FIGS. 6A and 6B illustrates an exemplary graph of a machining evaluation using time and frequency band signals, respectively. In FIG. 6A, a time-based signal profile 602 indicative of machine control signals acquired during a machining operation is compared to baseline profiles 604A and 604B, which are machining baseline parameters for the machining operation. By comparing the profiles 602, 604A, 604B, an abnormal amplitude 606 may be detected during the machining operation. In FIG. 6B, a frequency-based signal profile 610 is compared to a frequency-based baseline profile 612 (i.e., a machining baseline parameter) for the machining operation. Here, based on the signal profiles 610 and 612, an abnormal amplitude 614 can be detected during the machining operation.

In one form, for each machining operation, the system check module 508 associates one or more corrective actions for addressing a possible abnormal operation. The corrective actions may include but is not limited to: instructing the machine controller 110 to stop the machining operation; providing a notification (e.g., warning, alarm etc.) regarding the abnormal operation via the HMI 114; issuing a service request to be performed on the machining system 102 for addressing the abnormal operation; and/or requesting the machine controller 110 to perform a preidentified non-machining operation. For example, if the vibration of the spindle is abnormal (e.g., a tool baseline parameter for the spindle is not met), the system check module 508 has the machine controller 110 stop the machining operation and requests a spindle runout correction (i.e., a non-machining operation) as the corrective actions.

The system check module 508 is configured to perform a similar analysis for the non-machining evaluation 520. That is, when the machining operation is performing a non-machining operation, the system check module 508 performs the non-machining evaluation 520 to acquire data during the non-machining operation from the sensor, the machine controller, or a combination thereof. The system check module 508 then compares the data acquired with the non-machining baseline parameter associated with the identified non-machining operation to determine if the machining system is performing abnormally. If the CNC machine is operating abnormally, the system check module 508 issues a corrective action(s) associated with the non-machining operation.

With reference back to FIG. 1, in one form, the machine edge controller 104 may exchange data with other devices such as a manufacturing analysis system 120 via a communication network 122. Based on the location of the manufacturing analysis system 120, the system 120 may be communicably coupled to the communication network(s) 122 and to the machine edge controller 104 via wired and/or wireless communication link(s). Accordingly, the manufacturing analysis system 120 may include transceiver(s), router(s), input-output ports, among other components.

In one form, the manufacturing analysis system 120 is a cloud- or a fog-based computing server that includes one or more servers and database to store and analyze data. Specifically, the manufacturing analysis system 120 acquires and stores data from the machine edge controller 104 regarding the operation of each machining system 102 in communication with the machine edge controller 104. The data may include the contextual information, the numerical control, the operation characteristic(s), and/or the analysis performed by the machine edge controller 104. The manufacturing analysis system 120 is configured to include machine learning analytics to process large data sets to identify frequency of abnormal operations, determine parameters used by the machine edge control 104 for predicting possible abnormal operations, updating baseline parameters, optimization of machining cycles and non-machining cycles, and/or determine preventative maintenance schedule for inhibiting abnormal operations, among other operations. It should be readily understood that the manufacturing analysis system 120 is configured to store and analyze data from multiple machine edge controllers from one or more facilities.

In one form, at times a user such as an engineer or a technician, may access the information provided in the machine edge controller 104 and/or the manufacturing analysis system 120. Accordingly, using a computing device 124 such as a laptop or a tablet, the user may access information stored by the machine edge controller 104 and/or the manufacturing analysis system 120 via the communication network 122. This permits the user to remotely evaluate the status of one or more machining system 102 at a particular facility, access one or more analytic tools to view the baseline parameter for one or more machining system 102, and view performance trends provided by the manufacturing analysis system 120, among other information.

The machine edge controller of the present disclosure is configured to monitor the machining operation and non-machining operation of a single machining system or multiple machining systems performing the same or different operations. Using wired or wireless communication, the machine edge controller acquires data such as contextual information, operation characteristics, and/or numerical control from the machining system, and defines baseline parameters for the machining system. As described herein, the baseline parameters are used to determine if the machining system is operating abnormally, and based on such determination, the machine edge controller can take a corrective action. Accordingly, the machine edge controller is able to analyze data from one or more machining system in real-time or in other words, as the operation is being performed. By having the machine edge controller in communication with a manufacturing analysis system, advanced data analytics can be performed to learn about various machining systems and update various parameters used by the machine edge controller for monitoring the machining system.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the term "module" and/or "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

What is claimed is:

1. A system comprising:
   a computer numerical control (CNC) machining system configured to perform a machining operation to define a structural feature on a workpiece based on control signals employed to perform the machining operation; and
   a machine edge controller disposed external of the CNC machining system and communicably coupled to the CNC machining system, wherein the machine edge controller is configured to perform a learn process to define one or more machining baseline parameters and a machining evaluation during the machining operation of the CNC machining system,
   wherein in executing the learn process, the machine edge controller is configured to:
      acquire learning data indicative of characteristics of the CNC machining system from the CNC machining system during the machining operation for forming the structural feature, wherein the learning data is acquired for multiple cycles of the machining operation,
      generate the one or more machining baseline parameters based on the learning data acquired, wherein the one or more machining baseline parameters define a nominal response of the CNC machining system for performing the machining operation, wherein the one or more machining baseline parameters is provided as a signal profile, a statistical threshold, or a combination thereof; and
      associating the one or more machining baseline parameter with contextual data, wherein the contextual data includes data indicative of the machining operation being performed, a tool employed for the machining operation, and the structural feature being formed;
   wherein in executing the machining evaluation subsequent to the learn process, the machine edge controller is configured to:
      acquire data indicative of characteristics of the CNC machining system during the machining operation,
      compare the data with at least one of the one or more machining baseline parameters associated with the machining operation to determine an abnormal operation of the CNC machining system, and
   perform a corrective action in response to the CNC machining system operating abnormally.

2. The system of claim 1, wherein the CNC machining system includes:
   a CNC machine operable to machine the structural feature on the workpiece;
   a machine controller configured to operate the CNC machine, wherein the machine controller is configured to provide the control signals to the CNC machine during the machining operation; and
   a sensor configured to measure an operational characteristic of the CNC machine, wherein the data acquired includes the operational characteristic of the CNC machine from the sensor, the control signals from the machine controller, or a combination thereof.

3. The system of claim 2, wherein the machine controller of the machining system is communicably coupled to the machine edge controller by way of a wireless communication link or wired communication link.

4. The system of claim 2, wherein the sensor of the machining system is communicably coupled to the machine edge controller by way of a wireless communication link or wired communication link.

5. The system of claim 1, wherein the corrective action includes having the CNC machining system stop the machining operation, issue a notification to an operator regarding the abnormal operation, perform a non-machining operation, or a combination thereof.

6. A system comprising:
   a machining system configured to perform a machining operation to define a structural feature on a workpiece based on control signals to perform the machining operation, the machining system including:
      a computer numerical control (CNC) machine operable to machine the structural feature on the workpiece;
      a machine controller configured to operate the CNC machine, wherein the machine controller is configured to provide the control signals to the CNC machine during the machining operation; and
      a sensor configured to measure an operational characteristic of the CNC machine; and
   a machine edge controller disposed external of the machining system and communicably coupled to the machine controller and the sensor, wherein the machine edge controller is configured to perform a learn process to define one or more machining baseline parameters and a machining evaluation during the machining operation of the CNC machine, wherein in executing the learning process, the machining edge controller is configured to:
      acquire learning data indicative of characteristics of the machining system from the machining system during the machining operation for forming the structural feature, wherein the learning data is acquired for multiple cycles of the machining operation,
      generate the one or more machining baseline parameters based on the learning data acquired, wherein the one or more machining baseline parameters define a nominal response of the machining system for performing the machining operation, wherein the one or more machining baseline parameters is provided as a signal profile, a statistical threshold, or a combination thereof; and
      associating the one or more machining baseline parameter with contextual data, wherein the contextual data includes data indicative of the machining operation being performed, a tool employed for the machining operation, and the structural feature being formed;
   wherein in executing the machining evaluation subsequent to the learn process, the machine edge controller is configured to:
      acquire data indicative of the operational characteristic of the CNC machine from the sensor, the control signals from the machine controller, or a combination thereof, and compare the data with one or more machining baseline parameters associated with the machining operation to determine an abnormal operation of the CNC machine, and perform a corrective action in response to the CNC machining system operating abnormally.

7. The system of claim 6, wherein:

the machine controller is configured to store a plurality of machining programs to have the CNC machine perform a plurality of machining operations for defining multiple structural features on the workpiece, and the machine edge controller, during the learn process, is configured to define at least one machining baseline parameter for each of the plurality of machining operations, wherein the defined at least one machining baseline parameter is provided as the one or more machining baseline parameters.

8. The system of claim 6, wherein the machine controller is configured to provide contextual information regarding the machining operation to the machine edge controller, wherein the contextual information includes a part number of the workpiece, a timestamp, a program identification for the machining operation being performed, information identifying type of tool being used, or a combination thereof.

9. The system of claim 6, wherein the corrective action includes having the machining system stop the machining operation, issue a notification to an operator regarding the abnormal operation, perform a non-machining operation, or a combination thereof.

10. The system of claim 6, wherein:

the machining system is configured to perform a non-machining operation as part of a routine maintenance of the CNC machine, and the machine edge controller is configured to perform a non-machining evaluation during the non-machining operation, wherein in executing the non-machining evaluation, the machine edge controller is configured to:

acquire data during the non-machining operation from the sensor, the machine controller, or a combination thereof, and compare the data acquired for the non-machining operation with a non-machining baseline parameter associated with the non-machining operation to determine the abnormal operation of the CNC machine.

11. The system of claim 6 further comprising a manufacturing analysis system disposed remotely from the machine edge controller and the machining system, the manufacturing analysis system including a server and being communicably coupled to the machine edge controller to receive and store the data indicative of the operational characteristic from the sensor, the control signals from the machine controller, or a combination thereof.

12. The system of claim 6 further comprising a plurality of the machining systems communicably coupled to the machine edge controller, wherein the machine edge controller performs the machining evaluation for each of the plurality of machining systems based on the data received from a respective machining system and the one or more machining baseline parameters for the respective machining system.

13. The system of claim 6, wherein the machine controller of the machining system is communicably coupled to the machine edge controller by way of a wireless communication link or wired communication link.

14. The system of claim 6, wherein the sensor of the machining system is communicably coupled to the machine edge controller by way of a wireless communication link or wired communication link.

15. A system comprising:

a machining system configured to perform a plurality of machining operations to define one or more structural features on a workpiece using one or more tools, the machining system including:

a computer numerical control (CNC) machine operable to machine the one or more structural features on the workpiece based on control signals employed to perform a selected machining operation of the plurality of machining operations;

a machine controller configured to operate the CNC machine, wherein the machine controller is configured to provide the control signals to the CNC machine during a selected machining operation from among the plurality of machining operations; and a plurality of sensors configured to measure one or more operational characteristics of the CNC machine; and a machine edge controller disposed external of the machining system and communicably coupled to the machine controller and the plurality of sensors, wherein the machine edge controller is configured to perform a learn process to define one or more machining baseline parameters and a machining evaluation during the selected machining operation from among the plurality of machining system, wherein in executing the learn process, the machine edge controller is configured to:

acquire learning data indicative of characteristics of the CNC machining system from the CNC machining system during the machining operation for forming the structural feature, wherein the learning data is acquired for multiple cycles of the machining operation, generate the one or more machining baseline parameters based on the learning data acquired, wherein the one or more machining baseline parameters define a nominal response of the CNC machining system for performing the machining operation, wherein the one or more machining baseline parameters is provided as a signal profile, a statistical threshold, or a combination thereof; and associating the one or more machining baseline parameter with contextual data, wherein the contextual data includes data indicative of the machining operation being performed, a tool employed for the machining operation, and the structural feature being formed;

wherein in executing the machining evaluation subsequent to the learn process, the machine edge controller is configured to:

acquire data indicative of the one or more operational characteristics of the CNC machine from the plurality of sensors, the control signals from the machine controller, or a combination thereof, compare the data with one or more machining baseline parameters associated with the selected machining operation to determine an abnormal operation of the CNC machine, and perform a corrective action in response to the CNC machining system operating abnormally.

16. The system of claim 15, wherein the corrective action includes having the machining system: stop the selected machining operation; issue a notification to an operator regarding the abnormal operation; perform a non-machining operation; or a combination thereof.

17. The system of claim 15, wherein:
the machining system is configured to perform a plurality of non-machining operations as part of a routine maintenance of the CNC machine, and
the machine edge controller is configured to perform a non-machining evaluation during a selected non-machining operation from among the plurality of non-machining operations, wherein in executing the non-machining evaluation, the machine edge controller is configured to:
acquire data during the selected non-machining operation from the plurality of sensors, the machine controller, or a combination thereof, and
compare the data acquired for the selected non-machining operation with a non-machining baseline parameter associated with the selected non-machining operation to determine the abnormal operation of the CNC machine, wherein the non-machining baseline parameter defines a nominal response of the machining system for performing the selected non-machining operation.

18. The system of claim 15, wherein the machining system having the machine controller and the plurality of sensors is communicably coupled to the machine edge controller by way of a wireless communication link, wired communication link, or a combination thereof.

\* \* \* \* \*